(12) United States Patent
Liang (10) Patent No.: US 8,644,893 B2
(45) Date of Patent: Feb. 4, 2014

(54) IPAD AND KEYPAD COVER STRUCTURE

(76) Inventor: Hui-Hu Liang, Changhua Hsien (TW)

( * ) Notice: Subject to any disclaimer, the term of this patent is extended or adjusted under 35 U.S.C. 154(b) by 599 days.

(21) Appl. No.: 12/898,857

(22) Filed: Oct. 6, 2010

(65) Prior Publication Data

US 2012/0088557 A1    Apr. 12, 2012

(51) Int. Cl.
*H04M 1/00* (2006.01)

(52) U.S. Cl.
USPC ...................................... 455/575.1; 206/45.2

(58) Field of Classification Search
USPC ........ 455/575.1; 206/216, 45.2, 45.23, 45.24, 206/320, 764, 305, 765; 361/679.09, 807, 361/679.01, 679.55, 60, 600; 211/216; 335/219, 285, 302, 303, 304, 306; 24/303; 439/38, 218, 217, 39
See application file for complete search history.

(56) References Cited

U.S. PATENT DOCUMENTS

| 2011/0199727 A1* | 8/2011 | Probst .................... 361/679.09 |
| 2012/0211377 A1* | 8/2012 | Sajid ............................ 206/216 |

* cited by examiner

*Primary Examiner* — Charles Appiah
*Assistant Examiner* — Alexander Yi
(74) *Attorney, Agent, or Firm* — Jackson IPG PLLC (57) ABSTRACT

An iPad and keypad cover structure includes an iPad leather cover, a cover board, and a foldable member to connect the iPad leather cover and the cover board. The cover board has a fold line at a central portion thereof and at least one fixing tongue at an outer edge thereof. A keypad is provided on an inner side of the cover board. The iPad leather cover has a chamber at an inner side thereof and at least one transverse engaging piece disposed on an outer side thereof. The fixing tongue is inserted in the engaging piece of the iPad leather cover to secure the iPad and keypad cover structure when the cover board is folded face-to-face or back-to-back relative to the iPad leather cover. An iPad and the keypad are received therein face-to-face when the cover board is folded face-to-face relative to the iPad leather cover.

9 Claims, 8 Drawing Sheets

Fig. 7-A

IPAD AND KEYPAD COVER STRUCTURE

BACKGROUND OF THE INVENTION

1. Field of the Invention

The present invention relates to an iPad and keypad cover structure, and more particularly, to an iPad leather cover to couple with a keypad in conjunction with a strap to carry the iPad with ease and to use the keypad conveniently.

2. Description of the Prior Art

A conventional iPad cover structure comprises a foldable member to connect an iPad leather cover and a cover interlayer. The iPad leather cover has a chamber at in inner side to receive an iPad which is inserted from one side of the iPad leather cover. A support frame is provided on an outer side of the iPad leather cover. The cover interlayer has an insertion trough at an inner side thereof to receive a thin-type appliance or paper. When the iPad is used, the support frame is moved outward with its bottom edge against a plane to form a simple support with the iPad leather cover. The user can direct touch, listen or view the screen of the iPad. The iPad can be taken along and protected by the leather cover. However, the iPad is operated by the user's finger only. It is inconvenient to take a keypad which must be separately carried. Accordingly, the inventor of the present invention has devoted himself based on his many years of practical experiences to solve the problem.

SUMMARY OF THE INVENTION

The primary object of the present invention is to provide an iPad and keypad cover structure which comprises an iPad leather cover, a cover board, and a foldable member. The foldable member is used to connect the iPad leather cover and the cover board. The iPad leather cover has a chamber at an inner side thereof, at least one transverse engaging piece disposed on an outer side thereof. The cover board has a fold line at a central portion thereof and at least one fixing tongue at an outer edge thereof. A keypad is provided on an inner side of the cover board. The fixing tongue is inserted in the engaging piece of the iPad leather cover to secure the iPad and keypad cover structure when the cover board is folded face-to-face or back-to-back relative to the iPad leather cover. An iPad and the keypad are received therein face-to-face when the cover board is folded face-to-face relative to the iPad leather cover. When the keypad is disengaged from the cover board, the cover board can be reversely folded about the fold line and the fixing tongue is inserted in the engaging piece and the edge of the cover board is against the bottom edge of the engaging piece to form a triangular support base.

Preferably, the keypad is disposed at one side of the iPad leather cover close to the foldable member. The iPad leather cover and the cover board are folded face-to-face through the foldable member, and the iPad and the keypad are received therein face-to-face. The fixing tongue is inserted in the engaging piece to secure the iPad and keypad cover. When the user wants to use the keypad, the cover board is reversely folded about the fold line. The fixing tongue is inserted in the engaging piece and the edge of the cover board is against the bottom edge of the engaging piece to form a triangular support base, providing a support to the iPad at an appropriate angle.

Preferably, two ends of a strap are connected to two loops at two ends of the cover board and two support bands at the two ends of the cover board are adhered to outer adhesive straps provided on an outer side of the iPad leather cover for the user to hang on the shoulder or the neck. When the iPad leather cover is opened, the two support bands are used to support the iPad for the user to touch the iPad screen. The iPad can be carried with ease and the keypad can be taken along.

BRIEF DESCRIPTION OF THE DRAWINGS

FIG. 1-A is a rear perspective view of the keypad of the present invention;

FIG. 2-A is a perspective view in a folded status according to the first embodiment of the present invention;

FIG. 3-A is a rear perspective view showing that the cover board is reversely folded according to the first embodiment of the present invention;

FIG. 4-A is a perspective view in a folded status according to the second embodiment of the present invention;

FIG. 5-A is a rear perspective view showing that the cover board is reversely folded according to the second embodiment of the present invention;

FIG. 6-A is a side view according to the third embodiment of the present invention;

FIG. 7-A is a schematic view of the present invention with the strap in a folded status.

DETAILED DESCRIPTION OF THE PREFERRED EMBODIMENTS

Embodiments of the present invention will now be described, by way of example only, with reference to the accompanying drawings.

Figure 1:
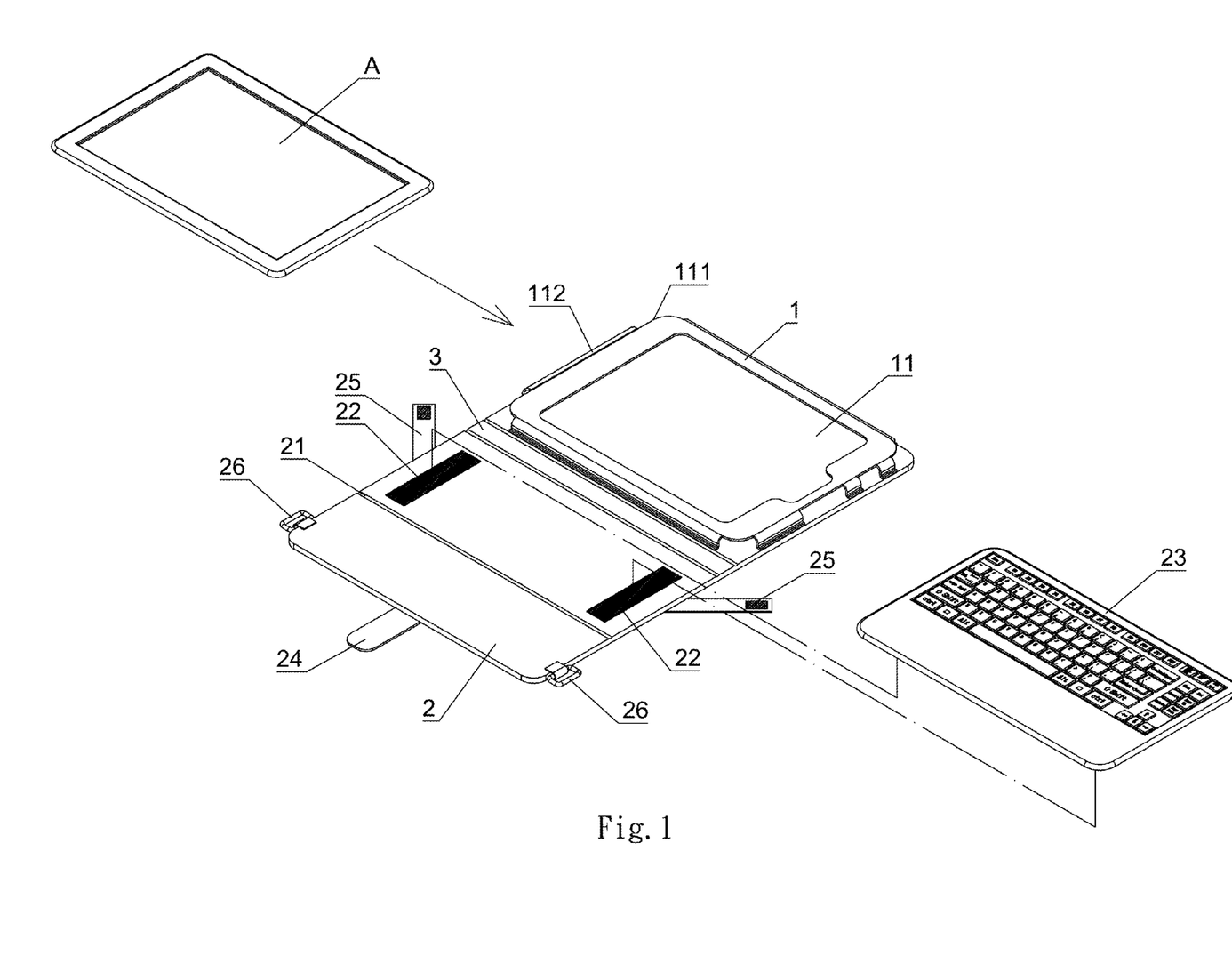
FIG. 1 is an exploded view of the present invention.
Figure 2:
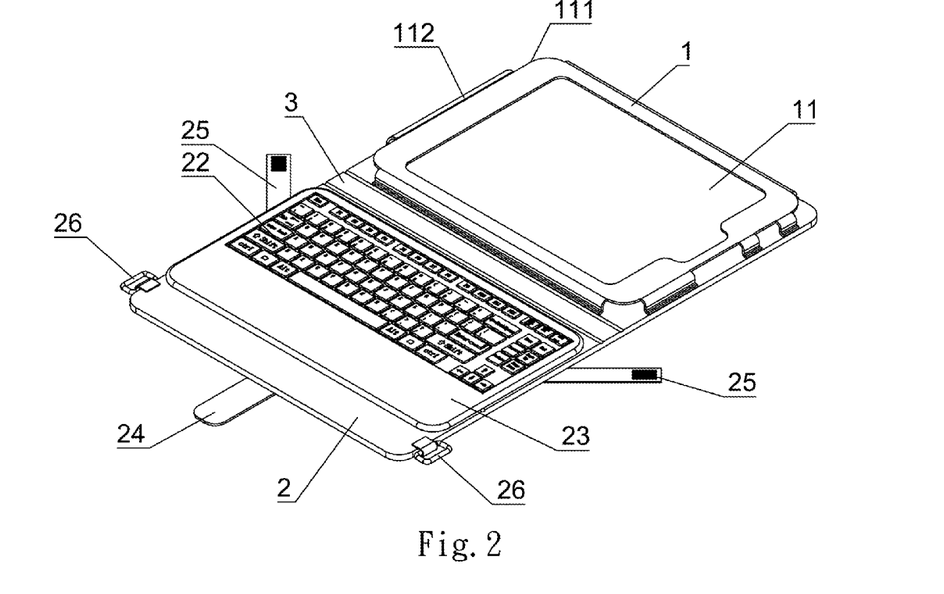
FIG. 2 is a perspective view according to a first embodiment of the present invention.

As shown in FIG. 1, FIG. 1-A and FIG. 2-A, the present invention comprises an iPad leather cover 1, a cover board 2, and a foldable member 3. The foldable member 3 is used to connect the iPad leather cover 1 and the cover board 2.

The iPad leather cover 1 has a chamber 11 at an inner side thereof, an insertion end 111, a side stop edge 112 to hold an iPad A, at least one transverse engaging piece 12 disposed on an outer side thereof, and a pair of outer adhesive straps 13 disposed at two ends of the outer side thereof.

The cover board 2 has a fold line 21 at a central portion thereof, at least one inner adhesive strap 22 on an inner side thereof, and at least one fixing tongue 24 at an outer edge thereof. The fixing tongue 24 will be inserted in the engaging piece 12 of the iPad leather cover 1 when the cover board 2 is folded face-to-face or back-to-back relative to the iPad leather cover 1. The inner adhesive strap 22 is used to engage with an adhesive strap 231 on the back of a keypad 23. A pair of support bands 25 and a pair of loops 26 are provided at two ends of the cover board 2. The support bands 25 are adhered to the outer adhesive straps 13. The loops 26 are adapted to connect with two ends of a strap 27. The present invention can carry the iPad easily and operate the keypad conveniently.

Figure 3:
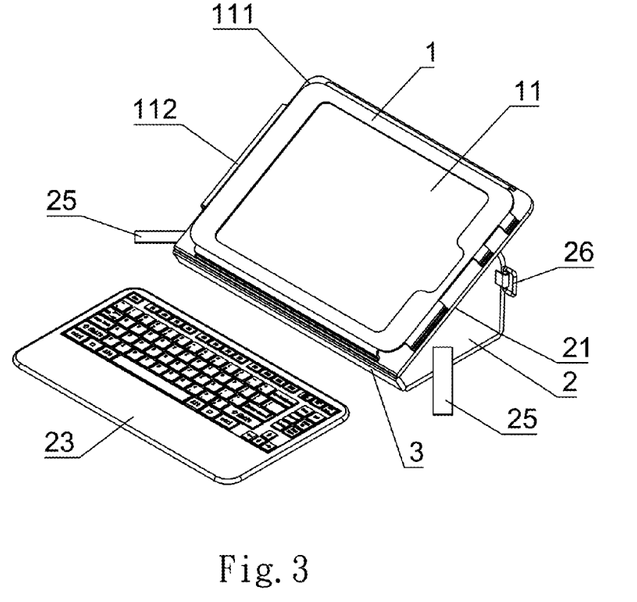
FIG. 3 is a perspective view showing that the cover board is reversely folded according to the first embodiment of the present invention.

FIG. 2, FIG. 3, FIG. 2-A and FIG. 3-A show a first embodiment of the present invention. The adhesive strap 231 of the keypad 23 is adhered to the inner adhesive strap 22 of the cover board 2 to be positioned thereon. The iPad leather cover 1 and the cover board 2 are folded face-to-face through the foldable member 3, and the iPad A and the keypad 23 are received therein face-to-face. The fixing tongue 24 is inserted in the engaging piece 12 to secure the iPad and the keypad, as shown in FIG. 2-A. The keypad 23 can be disengaged from the cover board 2 by separating the adhesive strap 231 from the inner adhesive strap 22. The cover board 2 is reversely folded about the fold line 21. The fixing tongue 24 is inserted in the engaging piece 12 and the edge of the cover board 2 is against the bottom edge of the engaging piece 12 to form a triangular support base, as shown in FIG. 3 and FIG. 3-A, providing a support to the iPad A at an appropriate angle. The keypad can be operated conveniently.

Figure 4:
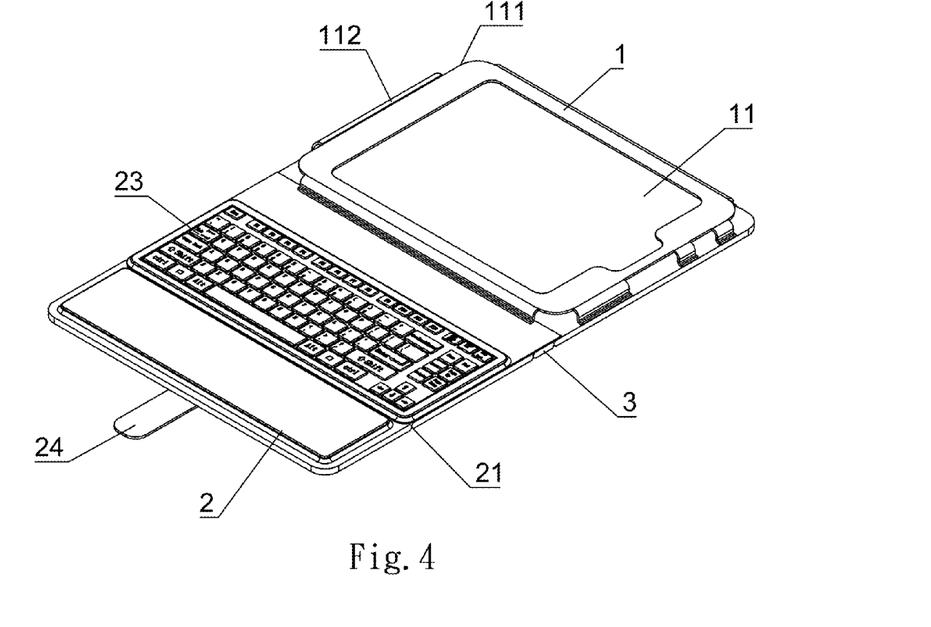
FIG. 4 is a perspective view according to a second embodiment of the present invention.
Figure 5:
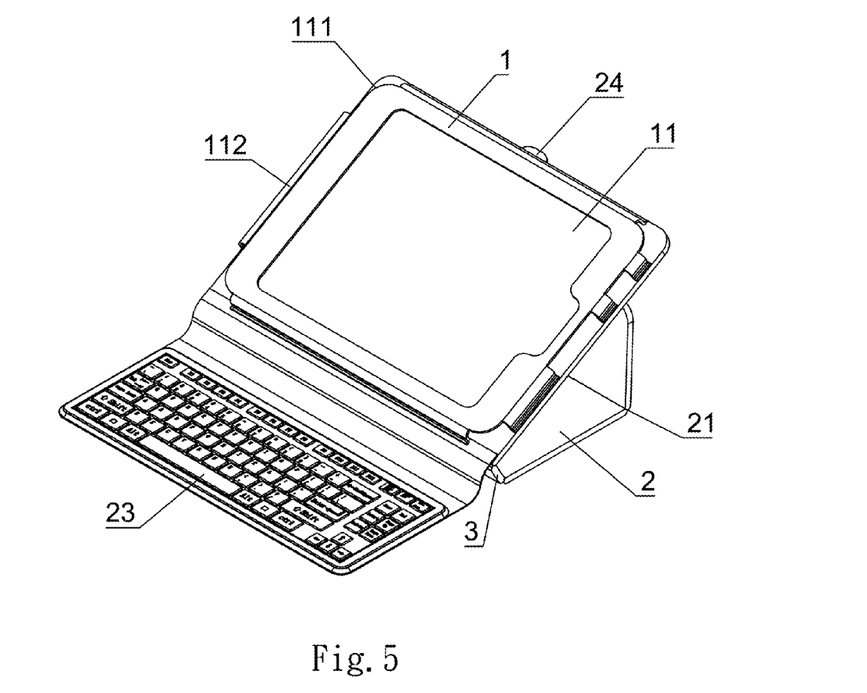
FIG. 5 is a perspective view showing that the cover board is reversely folded according to the second embodiment of the present invention.

FIG. 4, FIG. 5, FIG. 4-A and FIG. 5-A show a second embodiment of the present invention. The keypad 23 is disposed at one side of the iPad leather cover 1 close to the foldable member 3. The iPad leather cover 1 and the cover board 2 are folded face-to-face through the foldable member 3, and the iPad A and the keypad 23 are received therein face-to-face. The fixing tongue 24 is inserted in the engaging piece 12 to secure the iPad and keypad cover, as shown in FIG. 4-A. When the user wants to use the keypad 23, the cover board 2 is reversely folded about the fold line 21. The fixing tongue 24 is inserted in the engaging piece 12 and the edge of the cover board 2 is against the bottom edge of the engaging piece 12 to form a triangular support base, as shown in FIG. 5 and FIG. 5-A, providing a support to the iPad A at an appropriate angle. The second embodiment provides the same effect as the first embodiment.

Figure 6:
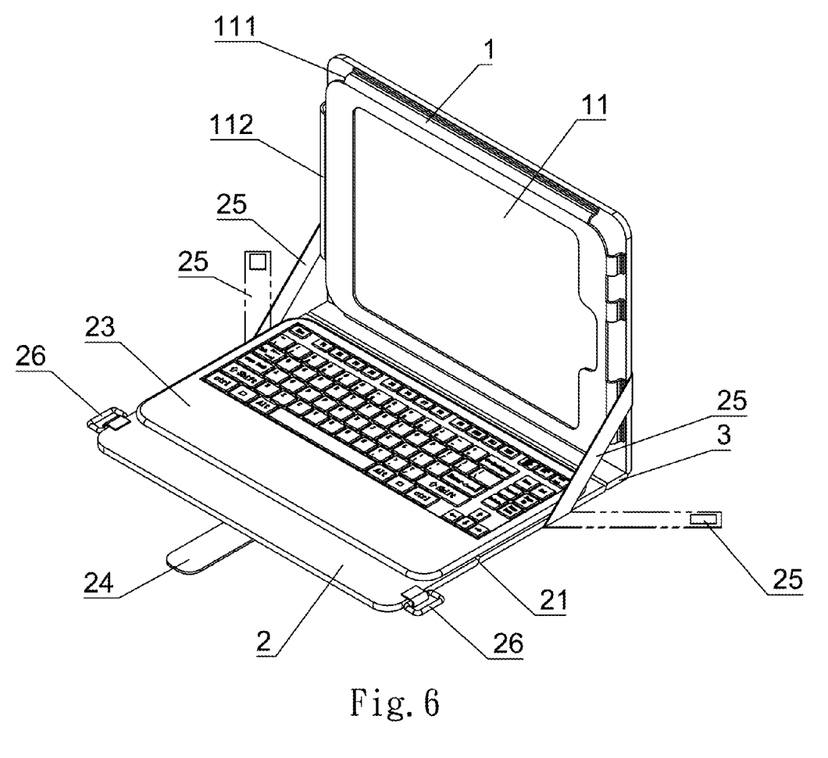
FIG. 6 is a perspective view according to a third embodiment of the present invention.
Figure 7:
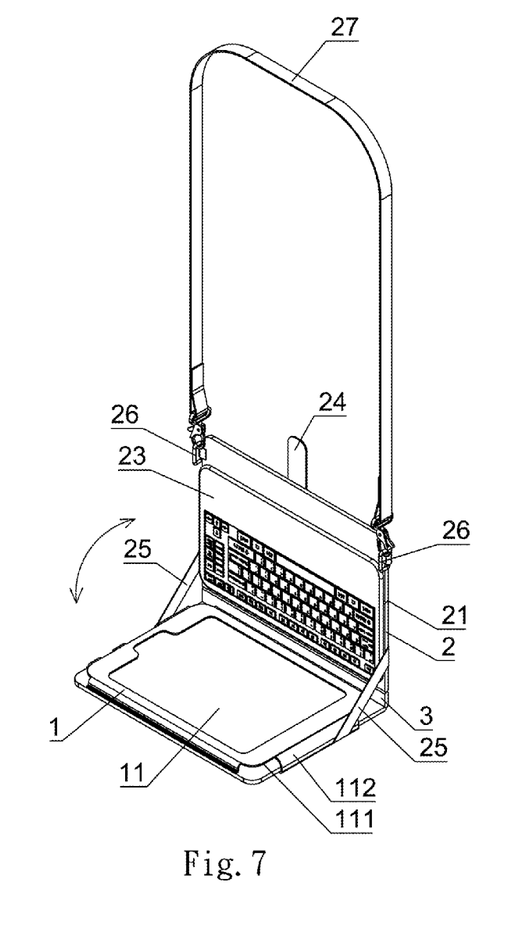
FIG. 7 is a schematic view of the present invention with the strap when in use.

FIG. 6, FIG. 7, FIG. 6-A and FIG. 7-A show a third embodiment of the present invention. The two ends of the strap 27 are connected to the two loops 26 of the cover board 2, as shown in FIGS. 7 and 7-A. The two support bands 25 of the cover board 2 are adhered to the outer adhesive straps 13 of the iPad leather cover 1, as shown in FIG. 7, for the user to hang on the shoulder or the neck. When the iPad leather cover 1 is opened, the two support bands 25 are used to support the iPad A for the user to touch the iPad screen, as shown in FIG. 6. The iPad can be carried with ease and the keypad can be taken along.

The engaging piece 12 can be replaced with a magnet, an adhesive strap or a button to engage with another magnet, adhesive strap or button disposed at the position of the fixing tongue 24, providing the same fastening effect.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. An iPad and keypad cover structure, comprising: an iPad leather cover having a chamber at an inner side thereof to receive an iPad, a cover board, and a foldable member to connect the iPad leather cover and the cover board; the iPad leather cover connected with a keypad disposed at one side of the iPad leather cover close to the foldable member, the iPad leather cover having at least one transverse engaging piece disposed on an outer side thereof; the iPad leather cover having a pair of support bands disposed at two ends of the cover board for selectively engaging with a pair of outer adhesive straps disposed at two ends of the outer side thereof; wherein the pair of support bands are in an unstretched configuration when engaging the pair of outer adhesive straps when the iPad and keyboard cover structure is in a first closed position; and wherein the pair of support bands are in a stretched configuration when engaging the pair of outer adhesive straps when the iPad and keyboard cover structure is in a second open position; the cover board having a fold line at a central portion thereof and at least one fixing tongue at an outer edge thereof, the keypad provided on an inner side of the cover board; thereby, the iPad leather cover and the cover board being folded face-to-face through the foldable member, the iPad and the keypad being received therein face-to-face, the fixing tongue being inserted in the engaging piece to secure the iPad and the keypad, the keypad being able to be disengaged from the cover board, the cover board being reversely folded about the fold line, the fixing tongue being inserted in the engaging piece to form a triangular support base; wherein the pair of support bands engage with the pair of outer adhesive straps to hold the iPad leather cover at approximately a 90 degree angle to the cover board.

2. The iPad and keypad cover structure, as claimed in claim 1, wherein the cover board has at least one inner adhesive strap on the inner side thereof for engaging with an adhesive strap on the back of the keypad.

3. The iPad and keypad cover structure, as claimed in claim 1, wherein the cover board comprises a pair of loops disposed at two ends thereof for connecting with two ends of a strap.

4. The iPad and keypad cover structure, as claimed in claim 1, wherein the engaging piece is a magnet, an adhesive strap or a button to engage with another magnet, adhesive strap or button disposed on the fixing tongue.

5. An iPad and keypad cover structure, comprising: an iPad leather cover having a chamber at an inner side thereof to receive an iPad therein, a cover board, and a foldable member to connect the iPad leather cover and the cover board; the iPad leather cover connected with a keypad disposed at one side of the iPad leather cover close to the foldable member, the iPad leather cover having at least one transverse engaging piece disposed on an outer side thereof; the iPad leather cover having a pair of support bands disposed at two ends of the cover board for selectively engaging with a pair of outer adhesive straps disposed at two ends of the outer side thereof; wherein the pair of support bands are in an unstretched configuration when engaging the pair of outer adhesive straps when the iPad and keyboard cover structure is in a first closed position; and wherein the pair of support bands are in a stretched configuration when engaging the pair of outer adhesive straps when the iPad and keyboard cover structure is in a second open position; the cover board having a fold line at a central portion thereof and at least one fixing tongue at an outer edge thereof; thereby, the iPad leather cover and the cover board being folded face-to-face through the foldable member, the iPad and the keypad being received therein face-to-face, the fixing tongue being inserted in the engaging piece to secure the iPad and the keypad, the keypad being able to be disengaged from the cover board, the cover board being reversely folded about the fold line, the fixing tongue being inserted in the engaging piece to form a triangular support base; wherein the pair of support bands engage with the pair of outer adhesive straps to hold the iPad leather cover at approximately a 90 degree angle to the cover board.

6. The iPad and keypad cover structure, as claimed in claim 5, wherein the cover board comprises a pair of loops disposed at two ends thereof for connecting with two ends of a strap.

7. The iPad and keypad cover structure, as claimed in claim 5, wherein the engaging piece is a magnet, an adhesive strap or a button to engage with another magnet, adhesive strap or button disposed on the fixing tongue.

8. The iPad and keypad cover structure, as claimed in claim 1,
wherein the pair of support bands extend away from the cover board at approximately a 45 degree angle to engage with the pair of outer adhesive straps.

9. The iPad and keypad cover structure, as claimed in claim 5,
wherein the pair of support bands extend away from the cover board at approximately a 45 degree angle to engage with the pair of outer adhesive straps.

* * * * *